US010586240B2

(12) United States Patent
Ghosh et al.

(10) Patent No.: US 10,586,240 B2
(45) Date of Patent: Mar. 10, 2020

(54) METHODS AND SYSTEMS FOR ESTIMATING VISITOR TRAFFIC AT A REAL PROPERTY LOCATION

(71) Applicant: MasterCard International Incorporated, Purchase, NY (US)

(72) Inventors: Debashis Ghosh, Charlotte, NC (US); Randy Shuken, Westport, CT (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 978 days.

(21) Appl. No.: 14/521,322

(22) Filed: Oct. 22, 2014

(65) Prior Publication Data
US 2016/0117688 A1    Apr. 28, 2016

(51) Int. Cl.
*G06Q 30/02* (2012.01)
*H04W 4/021* (2018.01)
*H04W 4/02* (2018.01)
*G06Q 50/16* (2012.01)

(52) U.S. Cl.
CPC ........ *G06Q 30/0201* (2013.01); *H04W 4/021* (2013.01); *H04W 4/023* (2013.01); *H04W 4/027* (2013.01); *G06Q 50/16* (2013.01)

(58) Field of Classification Search
CPC .... G06Q 20/16; G06Q 20/32; G06Q 20/3224; G06K 7/10366
USPC ....................................................... 705/0.29
See application file for complete search history.

(56) References Cited

U.S. PATENT DOCUMENTS

| 5,689,269 A | * | 11/1997 | Norris ..................... G01C 21/20 342/357.31 |
| 6,775,243 B1 | * | 8/2004 | Valentine ............. H04Q 3/0087 370/255 |
| 7,996,256 B1 | | 8/2011 | Anand et al. |
| 8,332,259 B1 | | 12/2012 | Zias et al. |
| 8,433,342 B1 | * | 4/2013 | Boyle ..................... H04L 67/20 455/456.3 |

(Continued)

FOREIGN PATENT DOCUMENTS

KR    10-2002-0047808 A    6/2002

OTHER PUBLICATIONS

Henry, Alan. How RetailStores Track You Using Your Smartphones (and How to Stop It) Jul. 19, 2013 from https://lifehacker.com.*

(Continued)

*Primary Examiner* — Johnna R Loftis
(74) *Attorney, Agent, or Firm* — Armstrong Teasdale LLP

(57) ABSTRACT

A computer-implemented method for estimating visitor traffic at a real property location based on interrogation signal data is provided. The method includes receiving, by one or more processors, a real property location, defining a geographic region that includes the real property location, receiving, by the one or more processors, interrogation signal data for a group of mobile devices included within the plurality of mobile devices, determining a location of each of the mobile devices included within the group of mobile devices over the selected period of time based on the received interrogation signal data, and estimating visitor traffic for the real property location over the selected period of time based on the location of each of the mobile devices included within the group of mobile devices.

19 Claims, 9 Drawing Sheets

(56) References Cited

U.S. PATENT DOCUMENTS

| | | | |
|---|---|---|---|
| 8,452,868 B2* | 5/2013 | Shafer | G06Q 10/087 340/568.1 |
| 8,738,437 B2 | 5/2014 | Gailey et al. | |
| 8,990,107 B2 | 3/2015 | Liang et al. | |
| 2003/0018550 A1 | 1/2003 | Rotman et al. | |
| 2003/0028417 A1 | 2/2003 | Fox | |
| 2005/0136845 A1* | 6/2005 | Masuoka | G01S 5/0294 455/67.14 |
| 2006/0059087 A1 | 3/2006 | Smith et al. | |
| 2006/0200378 A1* | 9/2006 | Sorensen | G06Q 10/063 705/7.29 |
| 2008/0147461 A1* | 6/2008 | Lee | G01C 21/206 705/7.34 |
| 2009/0271250 A1 | 10/2009 | Sriver et al. | |
| 2010/0093373 A1 | 4/2010 | Olsson et al. | |
| 2010/0131835 A1 | 5/2010 | Kumar et al. | |
| 2010/0306071 A1 | 12/2010 | Kay | |
| 2011/0029370 A1* | 2/2011 | Roeding | G06Q 30/00 705/14.38 |
| 2011/0047005 A1* | 2/2011 | Scanlan | G06Q 30/02 705/7.29 |
| 2011/0090080 A1 | 4/2011 | Yu | |
| 2011/0099046 A1 | 4/2011 | Weiss et al. | |
| 2011/0099047 A1 | 4/2011 | Weiss et al. | |
| 2011/0099048 A1 | 4/2011 | Weiss et al. | |
| 2011/0302061 A1 | 12/2011 | Olives et al. | |
| 2011/0306323 A1* | 12/2011 | Do | G01C 21/20 455/414.1 |
| 2012/0046979 A1 | 2/2012 | Chatterji et al. | |
| 2012/0226522 A1 | 9/2012 | Weiss et al. | |
| 2012/0226523 A1 | 9/2012 | Weiss et al. | |
| 2012/0238301 A1* | 9/2012 | Morrison | H04W 4/02 455/500 |
| 2012/0295639 A1* | 11/2012 | Fitoussi | H04W 4/021 455/456.3 |
| 2012/0316963 A1* | 12/2012 | Moshfeghi | G06Q 20/20 705/14.58 |
| 2013/0035110 A1* | 2/2013 | Sridhara | H04W 4/029 455/456.1 |
| 2013/0038490 A1* | 2/2013 | Garcia | G01S 13/74 342/451 |
| 2013/0167196 A1* | 6/2013 | Spencer | H04W 8/22 726/3 |
| 2013/0181867 A1* | 7/2013 | Sturdivant | G06Q 30/0241 342/368 |
| 2013/0198046 A1 | 8/2013 | Hammad et al. | |
| 2013/0325548 A1 | 12/2013 | Kulkarni et al. | |
| 2013/0325587 A1 | 12/2013 | Kothari et al. | |
| 2013/0345957 A1 | 12/2013 | Yang et al. | |
| 2013/0346206 A1 | 12/2013 | McKay | |
| 2014/0066098 A1* | 3/2014 | Stern | H04W 4/043 455/456.3 |
| 2014/0188384 A1 | 7/2014 | Wolfe | |
| 2014/0229616 A1 | 8/2014 | Leung et al. | |
| 2014/0236669 A1 | 8/2014 | Milton et al. | |
| 2014/0278987 A1 | 9/2014 | Busch | |
| 2014/0304038 A1 | 10/2014 | Milton et al. | |
| 2014/0324615 A1* | 10/2014 | Kulkarni | H04W 4/70 705/26.1 |
| 2015/0178739 A1* | 6/2015 | Ghosh | G06Q 30/0201 705/7.29 |
| 2015/0287319 A1* | 10/2015 | Cama | G08G 1/07 701/117 |
| 2015/0310460 A1 | 10/2015 | Tesanovic et al. | |
| 2016/0080486 A1* | 3/2016 | Ram | H04W 4/023 709/205 |
| 2016/0203506 A1 | 7/2016 | Butler, IV et al. | |
| 2016/0371722 A1* | 12/2016 | Maginnis | G06Q 30/0243 |
| 2018/0213357 A1* | 7/2018 | Richter | G06F 16/24578 |

OTHER PUBLICATIONS

Tynan, Dan. Thank You for Not Sharing. Jan. 17, 2013 from www.itworld.com.*

PCT/US2015/055364 International Search Report and Written Opinion dated Jan. 26, 2016 (17 pages).

* cited by examiner

US 10,586,240 B2

METHODS AND SYSTEMS FOR ESTIMATING VISITOR TRAFFIC AT A REAL PROPERTY LOCATION

BACKGROUND OF THE DISCLOSURE

The field of the disclosure relates generally to estimating visitor traffic at a real property, and more particularly to computer systems and computer-based methods for estimating visitor traffic at a real property location using signals emitted from mobile devices.

One of the key determinants of a good real property location, such as a merchant store is visitor traffic. However, merchant stores may have many visitors passing by at any given time with some visitors being prospective customers, browsing, window-shopping, or comparing prices while other visitors are actual customers that ultimately complete a purchase during the visit to the merchant store. Thus, not only is it challenging to determine the actual amount of visitor traffic a merchant store has during any given time period, it is also difficult to determine how many of these visitors to the merchant store are actually purchasing customers rather than simply visitors or merely passersby.

BRIEF DESCRIPTION OF THE DISCLOSURE

In one aspect, a computer-implemented method for estimating visitor traffic at a real property location based on interrogation signal data associated with mobile devices is described. The method includes receiving, by one or more processors, a real property location, defining a geographic region that includes the real property location, receiving, by the one or more processors, interrogation signal data for a group of mobile devices included within the plurality of mobile devices, the group of mobile devices being located in the geographic region of over a selected period of time, determining a location of each of the mobile devices included within the group of mobile devices over the selected period of time based on the received interrogation signal data, and estimating visitor traffic for the real property location over the selected period of time based on the location of each of the mobile devices included within the group of mobile devices.

In another aspect, a computer system for estimating visitor traffic at a real property location based on interrogation signal data associated with mobile devices is described. The computer system includes a probe database comprising interrogation signal data representing signals emitted from a plurality of mobile devices and a processor. The processor is programmed to receive a real property location, define a geographic region that includes the real property location, receive, from the probe database, interrogation signal data for a group of mobile devices included within the plurality of mobile devices, the group of mobile devices being located in the geographic region over a selected period of time, determine a location of each of the mobile devices included within the group of mobile devices over the selected period of time based on the received interrogation signal data, and estimate visitor traffic for the real property location over the selected period of time based on the location of each of the mobile devices included within the group of mobile devices.

In yet another aspect, a computer system for estimating a number of views of an outdoor advertisement by a viewer based on interrogation signal data associated with mobile devices is described. The computer system includes a probe database comprising interrogation signal data representing signals emitted from a plurality of mobile devices and a processor. The processor is programmed to receive an outdoor advertisement location, define a geographic region that includes the outdoor advertisement location, receive, from the probe database, interrogation signal data for a group of mobile devices included within the plurality of mobile devices, the group of mobile devices being located in the geographic region over a selected period of time, determine a location of each of the mobile devices included within the group of mobile devices and a direction in which each of the mobile devices is moving over the selected period of time based on the interrogation signal data, and estimate a number of viewers of the outdoor advertisement over the selected period of time based on the location and direction of each of the mobile devices over the selected period of time.

A non-transitory computer-readable medium having computer-executable instructions embodied thereon for estimating visitor traffic at a real property location based on interrogation signal data associated with mobile devices is described. The computer-executable instructions cause at least one processor to receive a real property location, define a geographic region that includes the real property location, receive interrogation signal data for the geographic region over a period of time, determine a location of each of the plurality of mobile devices over the period of time based on the received interrogation signal data, and estimate visitor traffic for the real property location over the period of time based on the location of each of the plurality of mobile devices over the period of time.

BRIEF DESCRIPTION OF THE DRAWINGS

FIG. 1 is a simplified block diagram of an example system including a plurality of computer devices in accordance with one example embodiment of the present disclosure.

FIG. 2 is a schematic diagram illustrating an example transaction card industry system.

FIG. 3 illustrates an example configuration of a server computing device system shown in FIG. 1, in accordance with one embodiment of the present disclosure.

FIG. 4 illustrates an example configuration of a computing device shown in FIG. 1, in accordance with one embodiment of the present disclosure.

FIG. 5 is a diagram of an example user interface displaying mobile probe data associated with a real property location, in accordance with one embodiment of the present disclosure.

FIG. 6 is a flowchart illustrating an example of the process of generating modeled paths from cardholder transactions using the system shown in FIG. 1, in accordance with one embodiment of the disclosure.

FIG. 7 is a flowchart illustrating an example of the process of determining a location value/effectiveness of an outdoor advertisement using the system shown in FIG. 1, in accordance with one embodiment of the disclosure.

FIG. 8 is an exemplary diagram illustrating vantage point boundaries associated with an outdoor advertisement, in accordance with one embodiment of the disclosure.

FIG. 9 is a diagram of components of one or more example computing devices that may be used in the system shown in FIG. 1.

DETAILED DESCRIPTION OF THE DISCLOSURE

Figure 1:
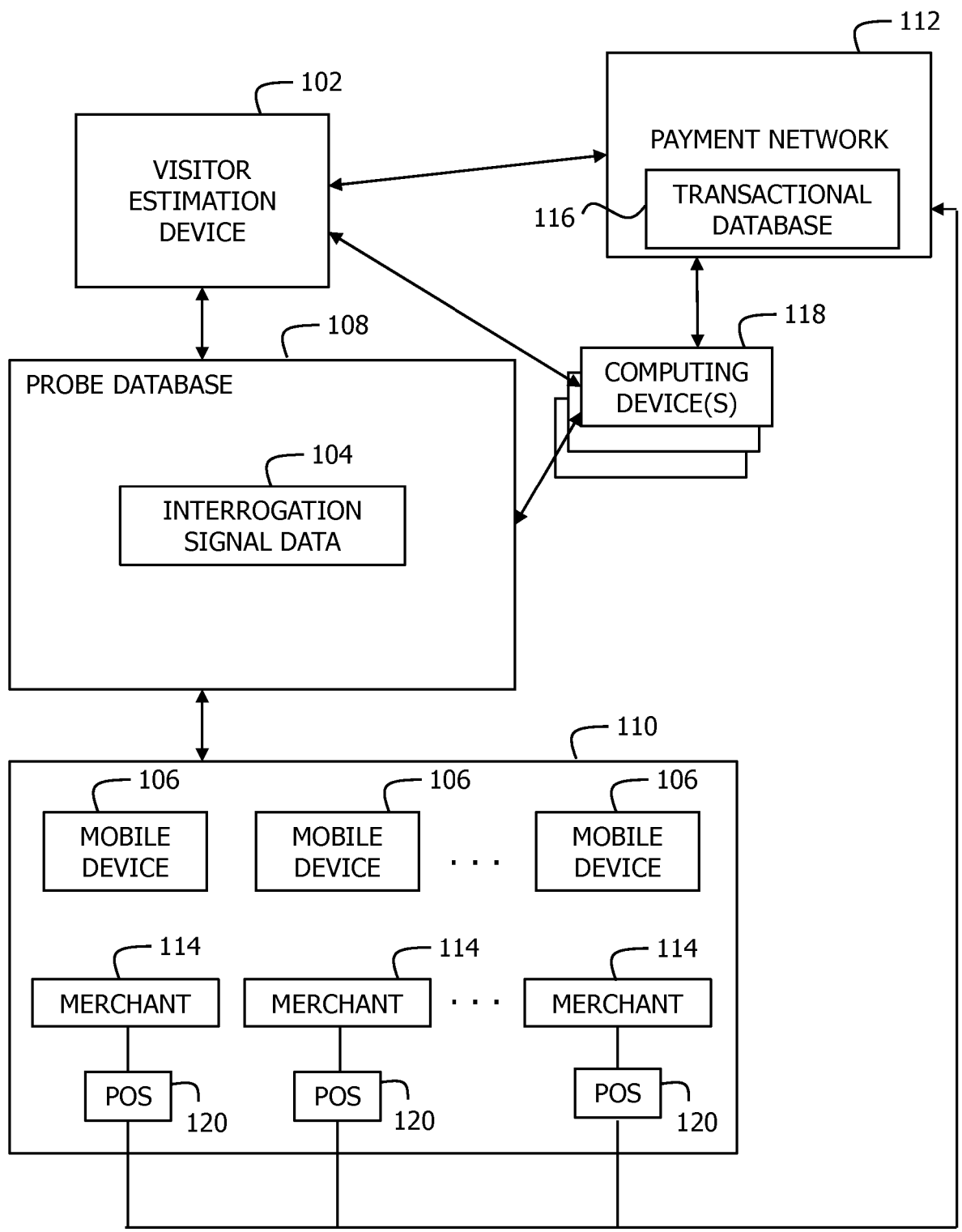
FIGS. 1-9 show example embodiments of the methods and systems described herein.

The following detailed description illustrates embodiments of the disclosure by way of example and not by way of limitation. The description clearly enables one skilled in the art to make and use the disclosure, describes several embodiments, adaptations, variations, alternatives, and uses of the disclosure, including what is presently believed to be the best mode of carrying out the disclosure. The disclosure is described as applied to an example embodiment, namely, methods and systems for providing estimated visitor traffic at or near real property, such as a merchant store. More specifically, the disclosure describes a visitor estimation computing device configured to determine a location of visitors at or near a merchant store by using interrogation signal data received from mobile devices to estimate visitor traffic for the real property location over a period of time based on the location of each of the plurality of mobile devices over the period of time.

In the example embodiment, the visitor estimation computing device is configured for use with a mobile probe database and a payment card processing network/payment network. The visitor estimation computing device includes a memory device and a processor in communication with the memory device, and is programmed to communicate with the mobile probe database and a payment network to receive probe data from mobile devices and transaction information for a plurality of cardholders.

For example, it would be useful to a variety of parties (e.g., a merchant, a landlord, a lender, and the like) to know how many visitors a piece of real property (such as a shopping mall) has as well as how many of these visitors to the real property are actually purchasing customers rather than simply visitors or merely passersby. Such information could be used to estimate a value of the real property, estimate potential to actual consumer ratios, and evaluate design choices for the real property. In addition, this information can also be used to establish efficient store hours, employee work hours, and distribution of employees in different departments in a store.

These visitors of real property are sometimes referred to as visitor traffic or potential consumer traffic. Visitor traffic for a piece of real property can be measured in a number of visitors per unit of time. For example, visitor traffic for a shopping mall may be on average 150 visitors or potential consumers per hour that the mall is open (e.g., 10 am to 9 pm). Visitor traffic can also be broken down on a per hour basis. Thus, instead of providing an average number of visitors for each hour a shopping mall is open, visitor traffic can be measured on an hourly basis. For example, from 10 am to 11 am the mall had foot traffic of 140 visitors, and from 11 am to noon the mall had foot traffic of 160 visitors.

Visitor traffic for a piece of real property can be used as a basis to estimate or evaluate a variety of parameters associated with the real property. For example, visitor traffic can be used to estimate a value of the real property. Visitor traffic can also be compared to actual transaction data from a piece of real property to determine a ratio of potential consumers to actual consumers for the property. For example, if a shopping mall had foot traffic of 150 visitors (or "potential consumers") from 10 am to 11 am on a Tuesday, and that same shopping mall had 25 actual transactions during that same period of time, then the ratio of potential consumers to actual consumers for that shopping mall during that period of time would be 6 to 1.

Other property parameters, such as design changes to real property, can also be evaluated using visitor traffic. For example, a measure of visitor traffic in a particular area of a shopping mall may help a landlord of the shopping mall better determine whether to install a new entrance to the shopping mall, and if so, where the new entrance should be located.

The methods and systems described herein use signals, such as interrogation signals, emitted from mobile devices and/or navigation systems (collectively referred to herein as "mobile devices"), such as, but not limited to, smartphones or global positioning systems (GPS) devices to determine visitor traffic at a piece of real property (e.g., a shopping mall including at least one physical merchant location). The visitors may be considered as window-shoppers or potential consumers until they make a purchase, at which time they are considered as customers or consumers. By using signals emitted from a smartphone or navigation system trying to connect to a network, and the intensity of the signals, a number of visitors, path of each visitor around a store, a dwell time of each visitor in certain locations near the store, and a proximity of each visitor to each other visitor are determinable.

When not connected to a wireless network, with a mobile device's wireless transceiver turned on, the mobile device sends out interrogation signals attempting to locate and determine available networks. These wireless interrogations often include a unique identifier, such as, but not limited to a Media Access Control (MAC) address. A strength of these signals varies with a distance away from the transceiver and may be used to determine a relative distance between the transceiver and a receiver. Triangulating the distances of multiple receivers receiving the same interrogation messages from the same wireless mobile device localizes a position of the mobile device in the merchant location. The unique identifier is used to keep track of the location information of each of a plurality of mobile devices at the same time.

The location information that is derived from the interrogation signals can then be provided for further processing. The location information can also include time information such that the location information can be stored for each of a plurality of devices at different times during a selected period of time. Accordingly, the movement of users using the mobile devices can be plotted or displayed on a user interface. The location data and the movement data can be further analyzed to estimate visitor traffic for the real property location for the predetermined period of time.

The payment network is configured to process payment card transactions between the merchant and its acquirer bank, and the cardholder and their issuer bank. Transaction information includes data relating to purchases made by cardholders at various merchants during a predetermined time period, including at least a merchant identifier, a geographic location of the merchant, and a cardholder identifier.

In the example embodiment, a payment network receives a plurality of payment transactions for processing. The payment network stores these payment transactions in a database. The visitor estimation computing device is in communication with the transaction database and receives the transactions stored in the database. Each transaction includes at least a unique identifier for each cardholder, a geographic location of a merchant, and a date and time for the transaction.

In one embodiment, the visitor estimation computing device selects all of the transactions that occurred within a specific period of time (e.g., between 5:00 PM on Dec. 14, 2013, and 3:00 AM on Dec. 15, 2013) and within a specific geographic area (e.g., a shopping mall or a specific merchant store). From that subset of transactions, the visitor estimation computing device compares the number of transactions with the number of estimated visitors at the geographic area within the specific period of time. This enables the visitor estimation computing device to estimate a ratio of visitors/consumers (a consumer being a visitor that has made a transaction).

In the example embodiment, the visitor estimation computing device may receive a user request to display the number, location, and paths of visitors at a real property location over a period of time. The user request includes at least a starting time and an end time (e.g., a predefined period of time) to analyze the interrogation data emitted from mobiles devices at the identified location. The visitor estimation computing device generates a mobile probe data map by combining the location of mobile devices identified by the interrogation data with a map of the geographic area identified by the user. The visitor estimation computing device thereafter provides the mobile probe data map to a user computing device for display.

Current systems have the technical problem that they are unable to accurately estimate potential consumer traffic at a merchant location. The methods and systems described herein may be implemented using computer programming or engineering techniques including computer software, firmware, hardware, or any combination or subset. The technical effect of the methods and systems described herein address the technical problem of the known systems by performing at least one of the following steps: (a) receiving, by one or more processors, a real property location; (b) defining a geographic region that includes the real property location; (c) receiving, by the one or more processors, interrogation signal data for a group of mobile devices included within the plurality of mobile devices, the group of mobile devices being located in the geographic region of over a selected period of time; (d) determining a location of each of the mobile devices included within the group of mobile devices over the selected period of time based on the received interrogation signal data; (e) estimating visitor traffic for the real property location over the selected period of time based on the location of each of the mobile devices included within the group of mobile devices; (f) receiving a second set of interrogation signal data for a second group of mobile devices included within the plurality of mobile devices, the second group of mobile devices being located in the geographic region over a second selected period of time; (g) designating the location of each of the mobile devices of the first group of mobile devices over the first selected period of time as first locations; (h) designating the location of each of the mobile devices of the second group of mobile devices over the second selected period of time as second locations; (i) comparing the first locations and the second locations; (j) updating the estimated visitor traffic for the real property location based on the comparison, the updated estimated visitor traffic including each of the mobile devices included within the first group of mobile devices, and each of the mobile devices included in the second group of mobile devices that are not also included in the first group of mobile devices; (k) displaying a direction of movement of each of the mobile devices included within the first group of mobile devices and the second group of mobile devices from the first locations to the respective second locations; (l) calculating a speed at which each of the mobile devices traveled from the respective first location to the respective second location; (m) comparing the calculated speeds of the mobile devices with a pedestrian threshold level speed; (n) identifying each of the mobile devices that have a calculated speed above the pedestrian threshold level speed as a mobile device within an automobile; (o) adjusting the estimated visitor traffic for the real property location to account for the mobile devices identified as being within an automobile; (p) rating each of the plurality of merchant stores based on their proximity to the determined location of each of the mobile devices over the selected period of time and the estimated visitor traffic over the selected period of time; (q) receiving payment transaction data for the real property location; (r) determining a number of payment transactions over the selected period of time based on the received transaction data; and (s) estimating customer traffic for the real property location over the selected period of time based on the estimated visitor traffic and the determined number of payment transactions over the selected period of time.

As used herein, the terms "transaction card," "financial transaction card," and "payment card" refer to any suitable transaction card, such as a credit card, a debit card, a prepaid card, a charge card, a membership card, a promotional card, a frequent flyer card, an identification card, a prepaid card, a gift card, and/or any other device that may hold payment account information, such as mobile phones, Smartphones, personal digital assistants (PDAs), key fobs, and/or computers. Each type of transactions card can be used as a method of payment for performing a transaction.

In one embodiment, a computer program is provided, and the program is embodied on a computer readable medium. In an example embodiment, the system is executed on a single computer system, without requiring a connection to a server computer. In a further example embodiment, the system is being run in a Windows® environment (Windows is a registered trademark of Microsoft Corporation, Redmond, Wash.). In yet another embodiment, the system is run on a mainframe environment and a UNIX® server environment (UNIX is a registered trademark of X/Open Company Limited located in Reading, Berkshire, United Kingdom). The application is flexible and designed to run in various different environments without compromising any major functionality. In some embodiments, the system includes multiple components distributed among a plurality of computing devices. One or more components are in the form of computer-executable instructions embodied in a computer-readable medium. The systems and processes are not limited to the specific embodiments described herein. In addition, components of each system and each process can be practiced independently and separately from other components and processes described herein. Each component and process can also be used in combination with other assembly packages and processes.

In one embodiment, a computer program is provided, and the program is embodied on a computer readable medium and utilizes a Structured Query Language (SQL) with a client user interface front-end for administration and a web interface for standard user input and reports. In another embodiment, the system is web enabled and is run on a business-entity intranet. In yet another embodiment, the system is fully accessed by individuals having an authorized access outside the firewall of the business-entity through the Internet. In a further embodiment, the system is being run in a Windows® environment (Windows is a registered trademark of Microsoft Corporation, Redmond, Wash.). The application is flexible and designed to run in various different environments without compromising any major functionality.

As used herein, an element or step recited in the singular and preceded with the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

As used herein, the term "database" may refer to either a body of data, a relational database management system (RDBMS), or to both. A database may include any collection of data including hierarchical databases, relational databases, flat file databases, object-relational databases, object oriented databases, and any other structured collection of records or data that is stored in a computer system. The above examples are for example only, and thus are not intended to limit in any way the definition and/or meaning of the term database. Examples of RDBMS's include, but are not limited to including, Oracle® Database, MySQL, IBM® DB2, Microsoft® SQL Server, Sybase®, and PostgreSQL. However, any database may be used that enables the systems and methods described herein. (Oracle is a registered trademark of Oracle Corporation, Redwood Shores, Calif.; IBM is a registered trademark of International Business Machines Corporation, Armonk, N.Y.; Microsoft is a registered trademark of Microsoft Corporation, Redmond, Wash.; and Sybase is a registered trademark of Sybase, Dublin, Calif.)

The term processor, as used herein, may refer to central processing units, microprocessors, microcontrollers, reduced instruction set circuits (RISC), application specific integrated circuits (ASIC), logic circuits, and any other circuit or processor capable of executing the functions described herein.

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are for example only, and are thus not limiting as to the types of memory usable for storage of a computer program.

FIG. 1 is a simplified block diagram of an example system 100 including a plurality of computer devices in accordance with one example embodiment of the present disclosure. In the example embodiment, system 100 includes a visitor estimation computing device 102 that accesses interrogation signal data 104 associated with mobile devices 106 from a probe database 108 in order to estimate visitor traffic at a real property location 110.

Probe database 108 stores interrogation signal data 104 that represents signals emitted from mobile devices 106. In one embodiment, interrogation signal data includes a location identifier for identifying a location of each mobile device 106 as each mobile device 106 emits a respective signal. As shown in FIG. 1, probe database 108 is stored remotely from visitor estimation computing device 102. In some embodiments, probe database 108 is decentralized.

In some embodiments, visitor estimation computing device 102 may include, be associated with, or is part of a payment network 112 described in further detail below with respect FIG. 2. Payment network 112 includes or is in communication with transactional database 116. In other embodiments, visitor estimation device 102 is associated with a third party and is merely in communication with payment network 112.

In the example embodiment, visitor estimation computing device 102 is a computer that includes a web browser or a software application, which enables visitor estimation computing device 102 to communicate with probe database 108, payment network 112, and computing device(s) 118 using the Internet. More specifically, visitor estimation computing device 102, probe database 108, payment network 112, and computing device(s) 118 are communicatively coupled to the Internet through many interfaces including, but not limited to, at least one of a network, such as the Internet, a local area network (LAN), a wide area network (WAN), or an integrated services digital network (ISDN), a dial-up-connection, a digital subscriber line (DSL), a cellular phone connection, and a cable modem. Visitor estimation computing device 102, probe database 108, and computing device 118 can each be any computing device capable of accessing the Internet including, but not limited to, a desktop computer, a laptop computer, a personal digital assistant (PDA), a cellular phone, a smartphone, a tablet, or other web-based connectable equipment.

Merchants 114 include or are associated with one or more point of sale systems 120 that are communicatively coupled with payment network 112. Point of sale systems 202 may be, but are not limited to, machines that accept card swipes, online payment portals, or stored payment card numbers for recurring transactions.

Figure 2:
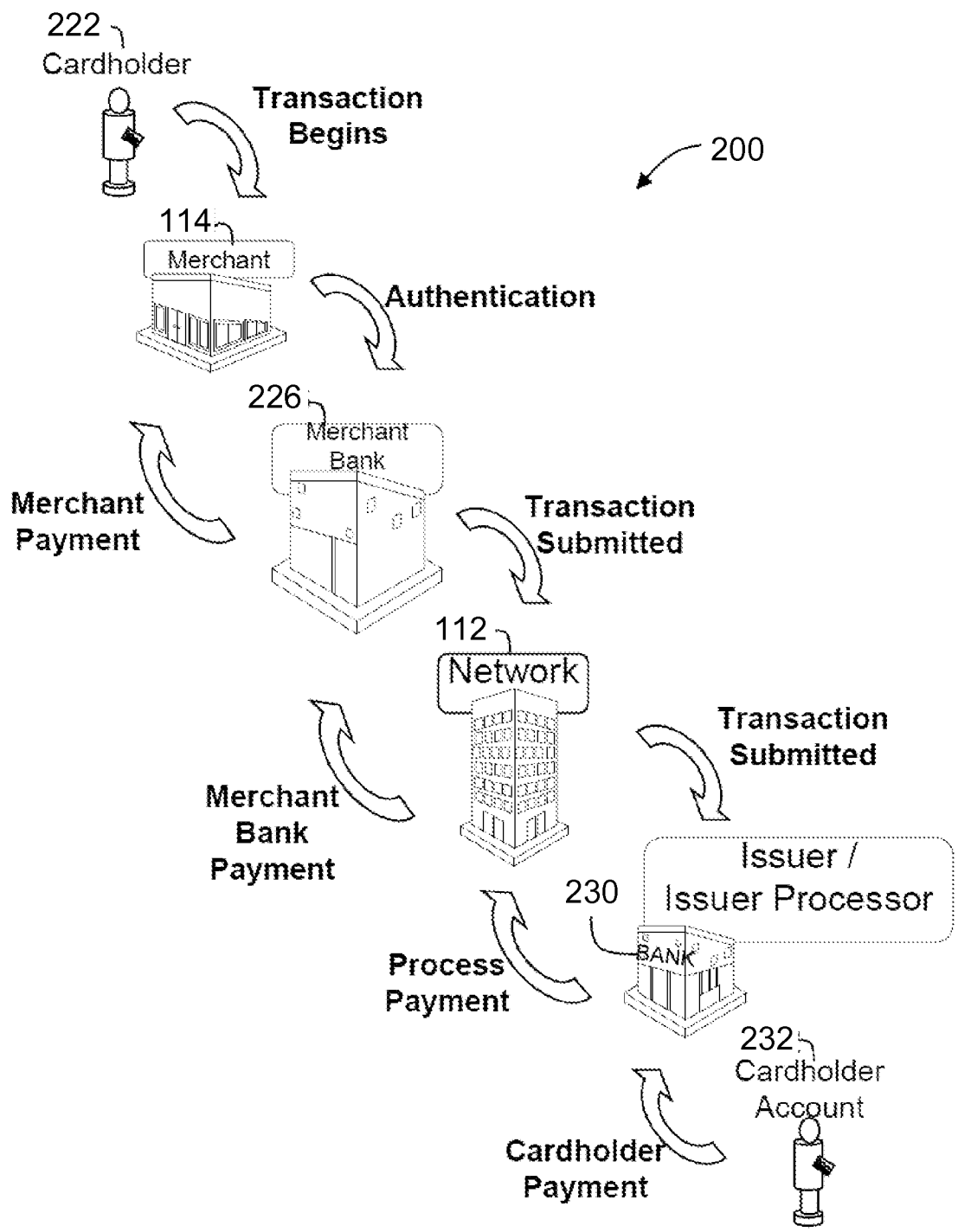

With reference now to FIG. 2, a schematic diagram illustrating an example payment network 200 for enabling payment-by-card transactions is provided. Embodiments described herein may relate to a transaction card system, such as a credit card payment system using the MasterCard® interchange network. The MasterCard® interchange network is a set of proprietary communications standards promulgated by MasterCard International Incorporated® for the exchange of financial transaction data and the settlement of funds between financial institutions that are members of MasterCard International Incorporated®. (MasterCard is a registered trademark of MasterCard International Incorporated located in Purchase, N.Y.).

In a typical transaction card system, a financial institution called the "issuer" issues a transaction card, such as a credit card, to a consumer or cardholder 222, who uses the transaction card to tender payment for a purchase from a merchant (e.g., one of merchants 114 shown in FIG. 1). In some cases, merchants 114 have a point of sale systems 120 (shown in FIG. 1) associated therewith. To accept payment with the transaction card, merchant 114 must normally establish an account with a financial institution that is part of the financial payment system. This financial institution is usually called the "merchant bank," the "acquiring bank," or the "acquirer." When cardholder 222 tenders payment for a purchase with a transaction card, merchant 114 requests authorization from a merchant bank 226 for the amount of the purchase. The request may be performed over the telephone, but is usually performed through the use of a point-of-sale terminal, which reads cardholder's 222 account information from a magnetic stripe, a chip, or embossed characters on the transaction card and communicates electronically with the transaction processing computers of merchant bank 226. Alternatively, merchant bank 226 may authorize a third party to perform transaction processing on its behalf. In this case, the point-of-sale terminal will be configured to communicate with the third party. Such a third party is usually called a "merchant processor," an "acquiring processor," or a "third party processor."

Using an interchange network (also referred to as a payment network) 112, computers of merchant bank 226 or merchant processor will communicate with computers of an issuer bank 230 to determine whether cardholder's 222 account 232 is in good standing and whether the purchase is covered by cardholder's 222 available credit line. Based on these determinations, the request for authorization will be declined or accepted. If the request is accepted, an authorization code is issued to merchant 114.

When a request for authorization is accepted, the available credit line of cardholder's 222 account 232 is decreased. Normally, a charge for a payment card transaction is not posted immediately to cardholder's 222 account 232 because bankcard associations, such as MasterCard International Incorporated®, have promulgated rules that do not allow merchant 114 to charge, or "capture," a transaction until goods are shipped or services are delivered. However, with respect to at least some debit card transactions, a charge may be posted at the time of the transaction. When merchant 114 ships or delivers the goods or services, merchant 114 captures the transaction by, for example, appropriate data entry procedures on the point-of-sale terminal. This may include bundling of approved transactions daily for standard retail purchases. If cardholder 222 cancels a transaction before it is captured, a "void" is generated. If cardholder 222 returns goods after the transaction has been captured, a "credit" is generated. Interchange network 112 and/or issuer bank 230 stores the transaction card information, such as a category of merchant, a merchant identifier, a location where the transaction was completed, amount of purchase, date and time of transaction, in transaction database 116 (shown in FIG. 1).

After a purchase has been made, a clearing process occurs to transfer additional transaction data related to the purchase among the parties to the transaction, such as merchant bank 226, interchange network 112, and issuer bank 230. More specifically, during and/or after the clearing process, additional data, such as a time of purchase, a merchant name, a type of merchant, purchase information, cardholder account information, a type of transaction, itinerary information, information regarding the purchased item and/or service, and/or other suitable information, is associated with a transaction and transmitted between parties to the transaction as transaction data, and may be stored by any of the parties to the transaction.

For debit card transactions, when a request for a personal identification number (PIN) authorization is approved by the issuer, cardholder's account 232 is decreased. Normally, a charge is posted immediately to cardholder's account 232. The payment card association then transmits the approval to the acquiring processor for distribution of goods/services or information, or cash in the case of an automated teller machine (ATM).

After a transaction is authorized and cleared, the transaction is settled among merchant 114, merchant bank 226, and issuer bank 230. Settlement refers to the transfer of financial data or funds among merchant's 114 account, merchant bank 226, and issuer bank 230 related to the transaction. Usually, transactions are captured and accumulated into a "batch," which is settled as a group. More specifically, a transaction is typically settled between issuer bank 230 and interchange network 112, and then between interchange network 112 and merchant bank 226, and then between merchant bank 226 and merchant 114.

Figure 3:
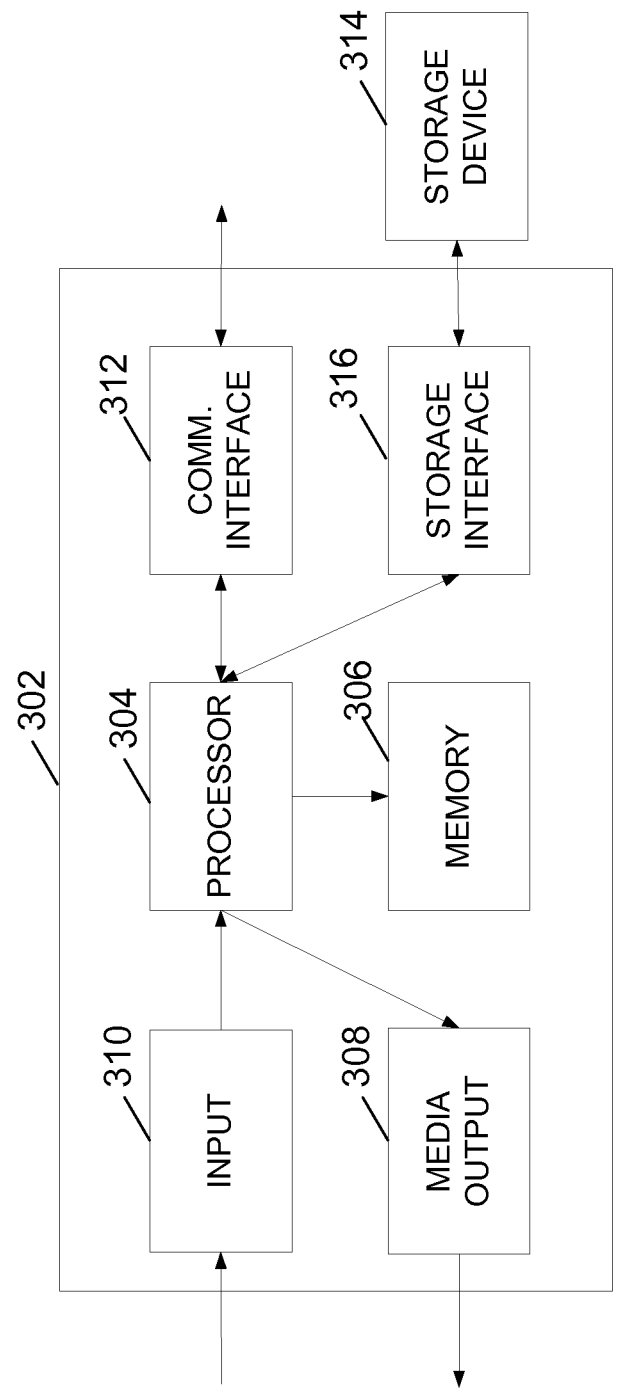

FIG. 3 illustrates an example configuration of visitor estimation computing device 102 shown in FIG. 1, in accordance with one embodiment of the present disclosure. For example, server computer device 302 may include, but is not limited to, visitor estimation computing device 102 (shown in FIG. 1). Server computer device 302 includes a processor 304 for executing instructions. In some embodiments, executable instructions are stored in a memory area 306. Processor 304 may include one or more processing units (e.g., in a multi-core configuration). Memory area 306 is any device allowing information such as executable instructions and/or transaction data to be stored and retrieved. Memory area 306 may include one or more computer readable media.

Server computer device 302 also includes at least one media output component 308 for presenting/sending information to a user and/or computing device 118 (shown in FIG. 1). Media output component 308 is any component capable of conveying information to a user and/or computing device 118. In some embodiments, media output component 308 includes an output adapter (not shown) such as a video adapter and/or an audio adapter. An output adapter is operatively coupled to processor 304 and operatively coupleable to an output device such as a display device (e.g., a cathode ray tube (CRT), liquid crystal display (LCD), light emitting diode (LED) display, or "electronic ink" display) or an audio output device (e.g., a speaker or headphones). In some embodiments, media output component 308 is configured to present a graphical user interface (e.g., a web browser and/or a client application) to a user. A graphical user interface may include, for example, an online store interface for viewing and/or purchasing items, and/or a wallet application for managing payment information. In some embodiments, server computer device 302 includes an input device 310 for receiving input from a user. Input device 310 may include, for example, a keyboard, a pointing device, a mouse, a stylus, a touch sensitive panel (e.g., a touch pad or a touch screen), a gyroscope, an accelerometer, a position detector, a biometric input device, and/or an audio input device. A single component such as a touch screen may function as both an output device of media output component 308 and input device 310.

Server computer device 302 may also include a communication interface 312, communicatively coupled to a remote device such as computing device 118. Communication interface 312 may include, for example, a wired or wireless network adapter and/or a wireless data transceiver for use with a mobile telecommunications network.

Stored in memory area 306 are, for example, computer readable instructions for estimating visitor traffic at real property location 110 based on interrogation signal data 104 associated with mobile devices 106 (shown in FIG. 1) and providing a user interface to a user via media output component 308 and, optionally, receiving and processing input from input device 310. A user interface may include, among other possibilities, a web browser and/or a client application. Web browsers enable users to display and interact with media and other information typically embedded on a web page or a website. In one embodiment, instructions may be stored by a cloud service, and the output of the execution of the instructions sent to the media output component 308.

Figure 6:
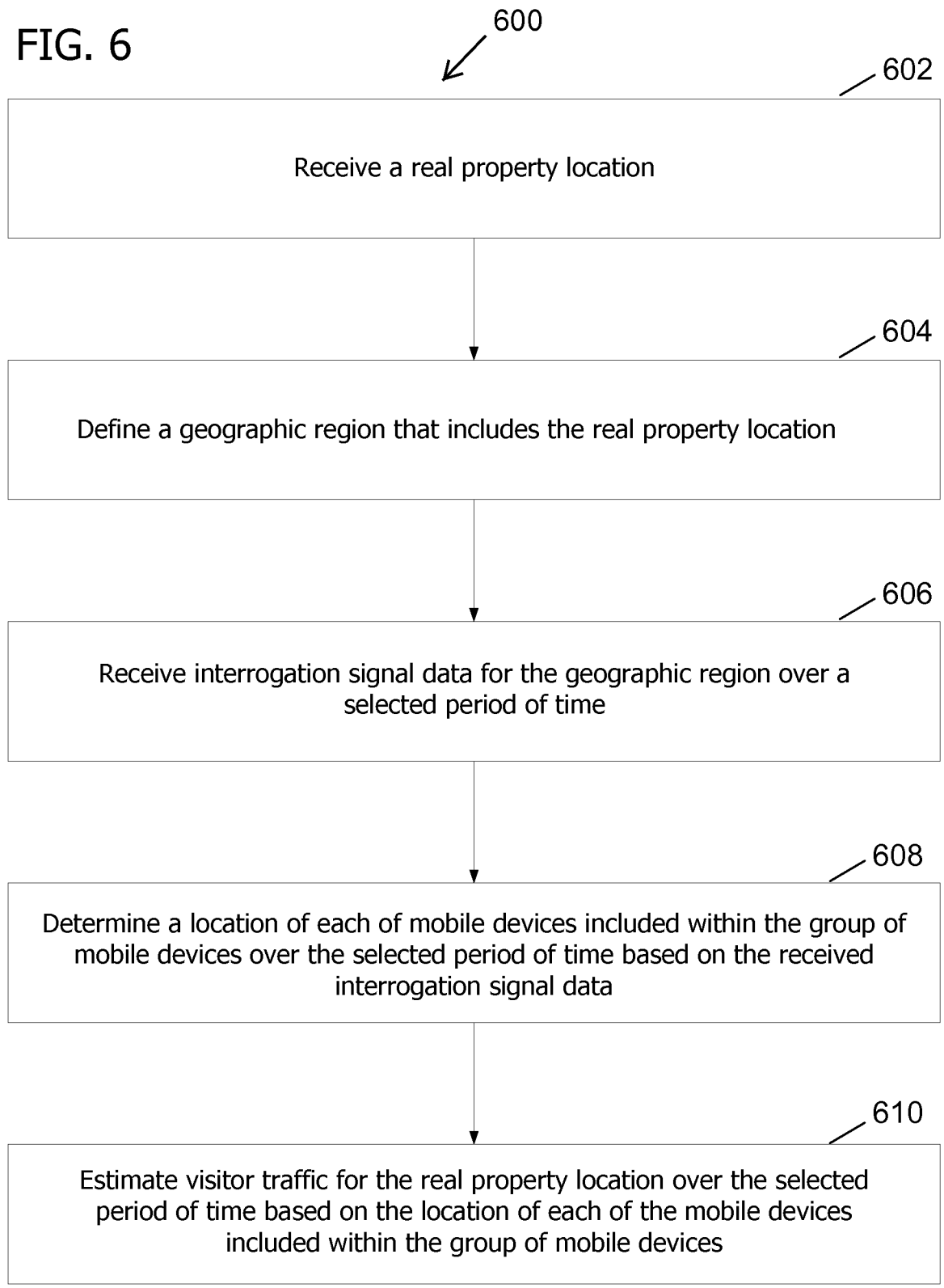

Processor 304 executes computer-executable instructions for implementing aspects of the disclosure. In some embodiments, processor 304 is transformed into a special purpose microprocessor by executing computer-executable instructions or by otherwise being programmed. For example, the processor 304 is programmed with the instruction such as illustrated in FIG. 6.

Processor 306 may also be operatively coupled to a storage device 314. Storage device 314 is any computer-operated hardware suitable for storing and/or retrieving data, such as, but not limited to, data associated with probe database 108 (shown in FIG. 1). In some embodiments, storage device 314 is integrated in server computer device 302. For example, server computer device 302 may include one or more hard disk drives as storage device 314. In other embodiments, storage device 314 is external to server computer device 302. For example, storage device 434 may include a storage area network (SAN), a network attached storage (NAS) system, and/or multiple storage units such as hard disks and/or solid state disks in a redundant array of inexpensive disks (RAID) configuration.

In some embodiments, processor 304 is operatively coupled to storage device 314 via a storage interface 316. Storage interface 316 is any component capable of providing processor 304 with access to storage device 314. Storage interface 316 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 304 with access to storage device 314.

Figure 4:
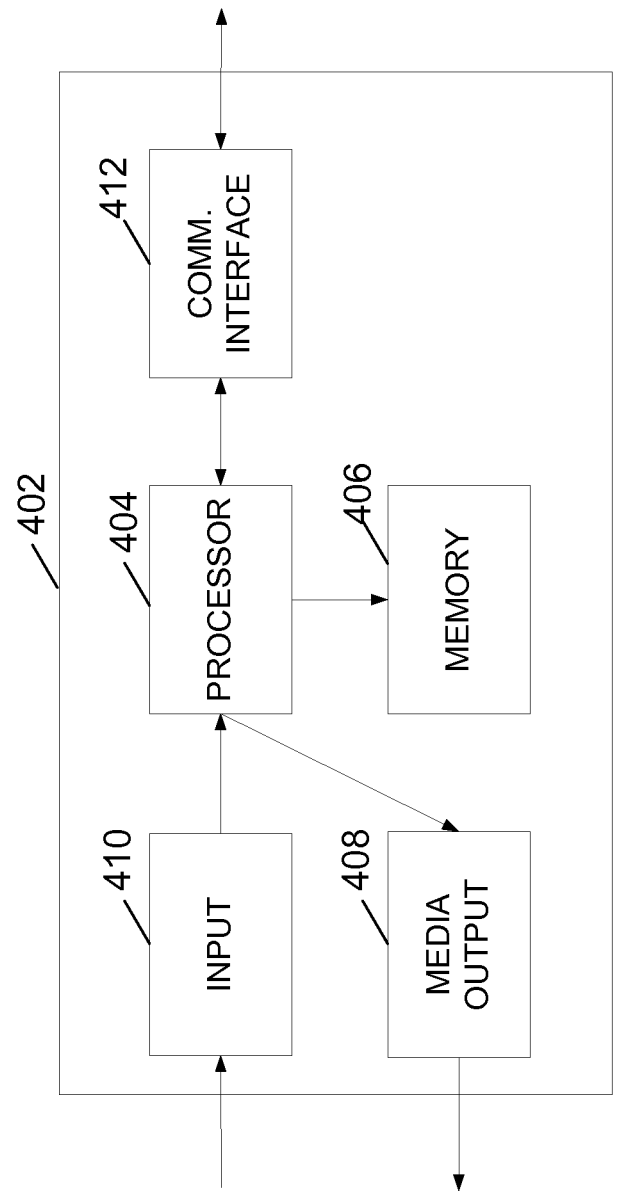

FIG. 4 illustrates an example configuration of computing device 118 shown in FIG. 1, in accordance with one embodiment of the present disclosure. Computing device 402 includes a processor 404 for executing instructions. In some embodiments, executable instructions are stored in a memory area 406. Processor 404 may include one or more processing units (e.g., in a multi-core configuration). Memory area 406 is any device allowing information such as executable instructions and/or transaction data to be stored and retrieved. Memory area 306 may include one or more computer readable media.

Computing device 402 also includes at least one media output component 408 for presenting/sending information to a user and/or visitor estimation computing device 102 (shown in FIG. 1). Media output component 408 is any component capable of conveying information to a user and/or visitor estimation computing device 102. In some embodiments, media output component 408 includes an output adapter (not shown) such as a video adapter and/or an audio adapter. An output adapter is operatively coupled to processor 404 and operatively coupleable to an output device such as a display device (e.g., a cathode ray tube (CRT), liquid crystal display (LCD), light emitting diode (LED) display, or "electronic ink" display) or an audio output device (e.g., a speaker or headphones). In some embodiments, media output component 408 is configured to present a graphical user interface (e.g., a web browser and/or a client application) to a user. A graphical user interface may include, for example, an online store interface for viewing and/or purchasing items, and/or a wallet application for managing payment information. In some embodiments, computing device 402 includes an input device 410 for receiving input from a user. Input device 410 may include, for example, a keyboard, a pointing device, a mouse, a stylus, a touch sensitive panel (e.g., a touch pad or a touch screen), a gyroscope, an accelerometer, a position detector, a biometric input device, and/or an audio input device. A single component such as a touch screen may function as both an output device of media output component 408 and input device 410.

Computing device 402 may also include a communication interface 412, communicatively coupled to a remote device such as visitor estimation computing device 102 or other computing devices 118. Communication interface 412 may include, for example, a wired or wireless network adapter and/or a wireless data transceiver for use with a mobile telecommunications network.

Stored in memory area 406 are, for example, computer readable instructions for providing a user interface to a user via media output component 408 and, optionally, receiving and processing input from input device 410. A user interface may include, among other possibilities, a web browser and/or a client application. Web browsers enable users to display and interact with media and other information typically embedded on a web page or a website. In one embodiment, instructions may be stored by a cloud service, and the output of the execution of the instructions sent to the media output component 408.

Figure 5:
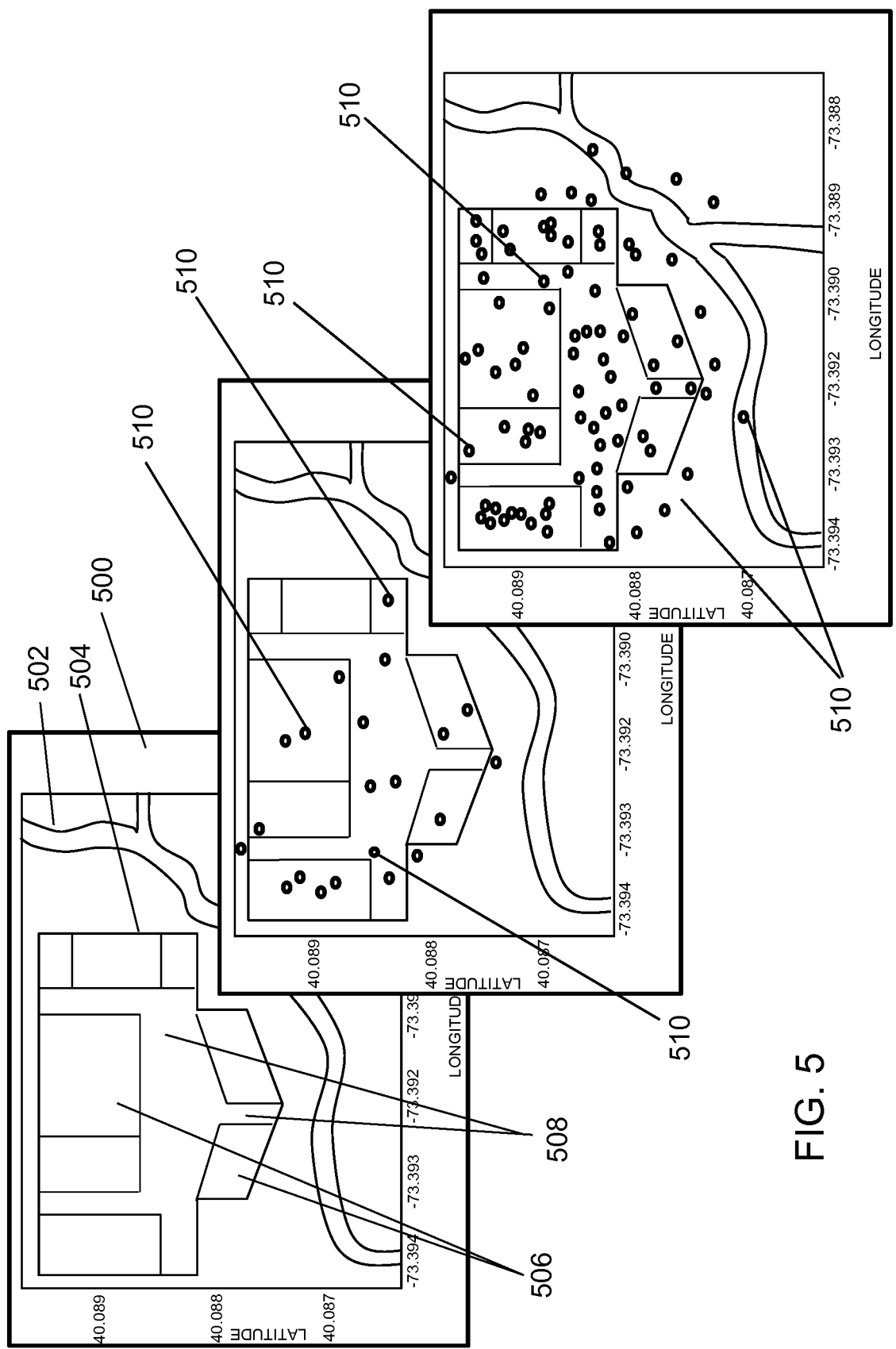

FIG. 5 is a diagram of an example user interface 500 displayed on visitor estimation computing device 102 and/or one or more of computing devices 118 (shown in FIG. 1), for displaying mobile probe data captured from a geographical region 502 in accordance with one embodiment of the present disclosure. In the example embodiment, the user interface 500 displays a map 504 of a shopping center/mall (e.g., real property location 110 shown in FIG. 1) within geographical region 502 on visitor estimation computing device 102 and/or one or more of computing devices 118. The map 504 includes a plurality of merchant stores 506 and walkways 508. While in this particular embodiment, map 504 displays merchant stores 506 and walkways 508 within a shopping center/mall, in other embodiments, map 504 of a real property location may include, for example, specific areas within a merchant store, a museum, a zoo, an amusement park, a stadium, a convention center, a casino, a school, a gym, a restaurant, a town/city, (e.g., with roads, highways, interstates, walking paths, bus routes, subway lines, and bike paths).

In addition to map 504, user interface 500 displays a plurality of data points 510. These data points vary in density to show the relative number of visitors at various locations within geographical region 502 at a particular time or within a predefined period of time. In some embodiments, the user interface 500 may be configured to display different data points as different colors and/or apply an ID to each data point to distinguish each data point (e.g., mobile device) from one another as the mobile devices travel within geographical region 502.

FIG. 6 is a flowchart illustrating an example of a process 600 of estimating visitor traffic at a real property location based on interrogation signal data associated with mobile devices using system 100 shown in FIG. 1, in accordance with one embodiment of the disclosure. Process 600 may be implemented by a processor 304 (shown in FIG. 3) within or remote from visitor estimation computing device 102 (shown in FIG. 1). In the example embodiment, visitor estimation computing device 102 receives 602 a real property location, such as, a shopping mall/center, a merchant store, a museum, a zoo, an amusement park, a stadium, a convention center, a casino, a school, a gym, a restaurant, a town/city, (e.g., with roads, highways, interstates, walking paths, bus routes, subway lines, and bike paths). In one embodiment, data that defines the structural/architectural/property boundaries associated with the real property location are provided along with the real property location. At 604, visitor estimation computing device 102 defines a geographical region that includes the real property location 110 (shown in FIG. 1). In one embodiment, the geographical region is based on a pairing of latitude and longitude in a Cartesian coordinate grid, for example, a spherical coordinate system or an ellipsoid-based system such as the World Geodetic System, and the like.

At 606, visitor estimation computing device 102 receives interrogation signal data 104 (shown in FIG. 1) for the geographic region over a period of time (e.g., from a few seconds to several minutes), with interrogation signal data 104 representing signals emitted from a plurality of mobile devices 106 (shown in FIG. 1). As used herein, a "group of mobile devices" 106 refers generally to a subset of the plurality of mobile devices 106 located within the geographic region. In one embodiment, signals, such as interrogation signals, emitted from mobile devices and/or navigation systems (e.g., mobile devices 106 shown in FIG. 1), such as, but not limited to, smartphones or GPS devices are collected and stored in probe database 108 (as shown in FIG. 1) as interrogation signal data 106. For example, mobile devices 106, or other transmitting devices, can be located through cellular networks (not shown) using a triangulation system by using cell towers that may locate and/or track the position of mobile devices 106. The location of mobile devices 106 may be mapped to a geographical location to provide location, speed, and/or other travel information. The transmissions acquired from mobile devices 106 may include data from a GPS enables device (such as location, time, direction, and velocity) and/or may be timed or power measured to determine a position of each mobile device 106.

When not connected to a wireless network, with mobile device's 106 wireless transceiver turned on, mobile devices 106 send out interrogation signals attempting to locate and determine available networks. These wireless interrogations often include a unique identifier, such as, but not limited to a Media Access Control (MAC) address. A strength of these signals varies with a distance away from the transceiver and may be used to determine a relative distance between the transceiver and a receiver. Triangulating the distances of multiple receivers receiving the same interrogation messages from the same mobile device 106 localizes a position of the mobile device in a merchant location 114 (shown in FIG. 1). The unique identifier is used to keep track of the location information of each of a plurality of mobile devices 106 at the same time. The location information that is derived from the interrogation signals can then be provided for further processing.

At 608, visitor estimation computing device 102 determines a location of each of mobile device 106 over the period of time based on the interrogation signal data 104 received from probe database 108. Thus, by using signals emitted from a smartphone and/or GPS, a number of visitors, a path of each visitor around real property location 110, a dwell time of each visitor in certain locations of real property location 110, a proximity of each visitor to each other visitor are determinable, as well as a determination as to whether a "visitor" is merely a window-shoppers or an actual customer/consumer. As such, the number of visitors to a piece of real property as well as how many of these visitors to the real property are actually purchasing customers rather than simply visitors or merely passersby can be determined by visitor estimation computing device 102.

In one embodiment, to determine that a visitor is or is not a customer/consumer, visitor estimation computing device 102 receives payment transaction data for the real property from payment network 112 (shown in FIG. 1). A number of payment transactions that occurred over the period of time can be determined based on the received transaction data as well as the specific transaction themselves, which identify one or more of the following: a time of day of the transaction; the consumer; the item/service purchased; and the merchant store where the transaction occurred. Using the number of payment transactions with the known number of visitors over the period of time, visitor estimation computing device 102 can estimate customer traffic for the real property location 110 over the period of time.

In one embodiment, to identify whether "visitors" have moved since the interrogation signal data 104 was acquired during the period of time, visitor estimation computing device 102 receives a second set of interrogation signal data for the geographic region over a second period of time. Visitor estimation computing device 102 can then designate the location of each of a first group of mobile devices 106 from the first set of interrogation data (i.e., "interrogation data") 104 as a first location. Visitor estimating computing device 102 can further designate the location of each of a second group of mobile devise 106 as a second location based on the second set of received interrogation signal data 104. Visitor estimating computing device 102 may then compare first locations to second locations. The estimated visitor traffic may then be updated based on the comparison by including each of the mobile devices 106 from the first group of mobile devices 106 and each of the mobile devices 106 from the second group of mobile devices 10 that are not also included in the first group. Using this information, visitor estimation computing device 102 can display a direction of movement of each mobile device 106/visitors located within real property location 110 between the period of time and the second period of time. In addition, visitor estimation computing device 102 can calculate a speed at which each mobile device 106 traveled from their location (e.g., first location) to their respective second locations, compare the calculated speeds of mobile devices 106 with a pedestrian threshold level speed (e.g., 10 mph), and identify each of mobile device 106 that have a calculated speed above the pedestrian threshold level speed as a mobile device 106 within an automobile. As such, these alleged "visitors" that are associated with a mobile device 106 that is identified as being in an automobile can be classified/identified as non-visitors/an automobile and the estimated visitor traffic for the real property location 110 can be adjusted to account for each mobile device 106 identified as being within an automobile.

In one embodiment, the estimated visitor traffic/consumer traffic within real property location 110 could be used to for one or more of the following: estimate a value of the real property, estimate a potential to actual consumer ratio, and evaluate design choices for the real property. In addition, estimated visitor traffic/consumer traffic within real property location 110 can also be used to establish efficient store hours, employee work hours, and distribution of employees in different departments in a store. In one embodiment, a location value for merchant stores and/or advertisements within the real property can be determined by rating each merchant store 114 and advertisement locations based on their proximity to the determined location of each mobile device 106 over the period of time and the estimated visitor traffic over the period of time. The rating may be based on the number of visitors over a period of time (hours, days, time of day etc.), the number of visitors per customer (e.g., for every six visitors one makes a payment transaction), and/or how long visitors "linger" around a certain area. This rating may also be used to determine a monetary value of a particular location within real property location 110 and/or used to change design/layout of real property location 114.

The location information can also include time information such that the location information can be stored for each of a plurality of mobile devices 106 at different times during a selected period of time. Accordingly, the movement of users using mobile devices 106 can be plotted or displayed on a user interface 500 (shown in FIG. 5). The location data and the movement data can be further analyzed to estimate visitor traffic for real property location 110 for the predetermined period of time.

In a further embodiment, probe data can also be utilized to determine a location value and/or an effectiveness of an "outdoor" advertisement, such as a billboard along a road or walkway or a marquee on a side of building. For example, as explained in further detail below, probe data can be used to measure road and/or foot traffic that have a clear vantage point of the particular outdoor advertisement at any given time to determine a number of views the outdoor advertisement may have over a period of time.

Figure 7:
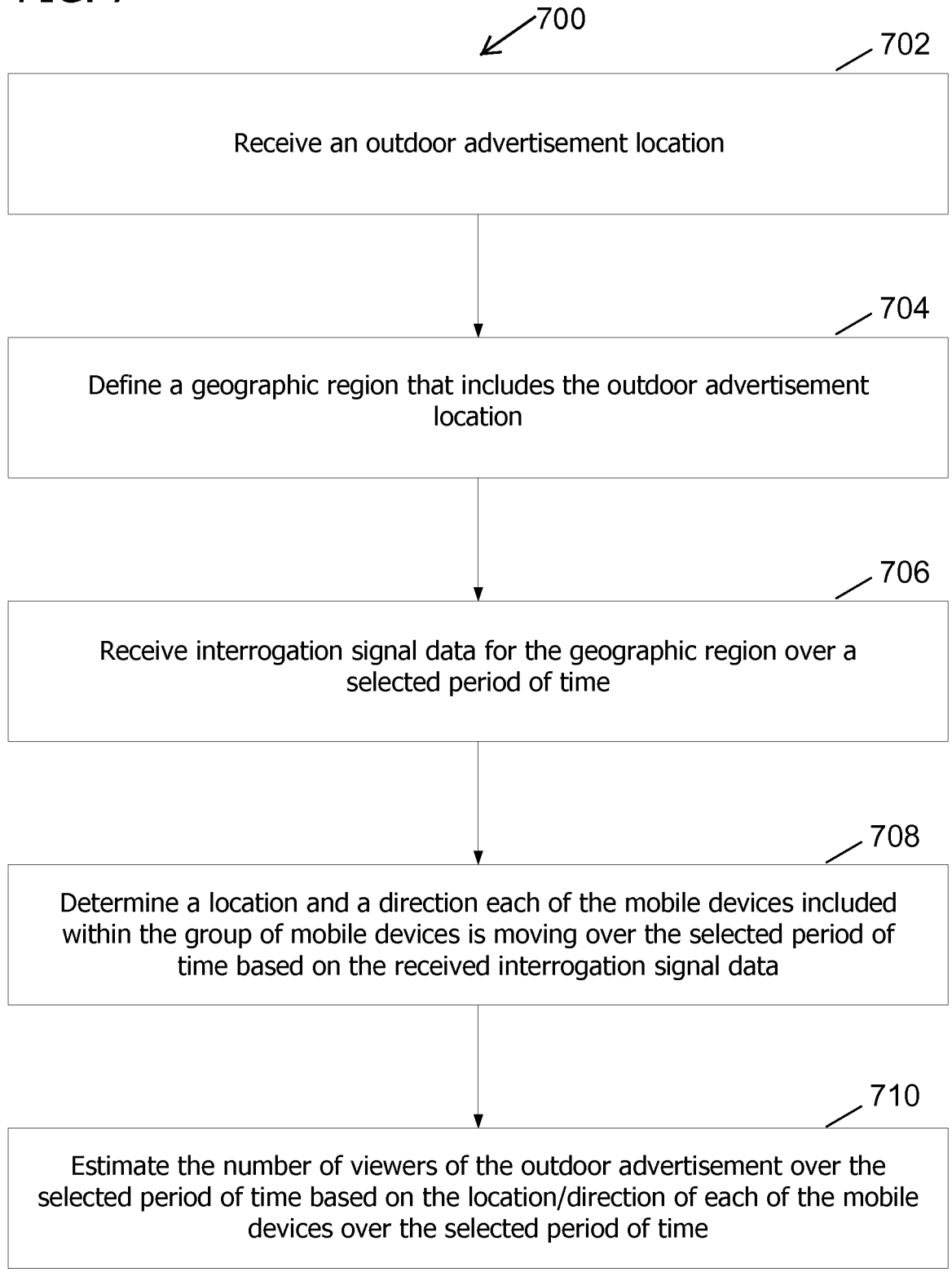

With reference now to FIG. 7, a flowchart illustrating an example of a process 700 of determining an effectiveness and/or a location value of an outdoor advertisement based on interrogation signal data associated with mobile devices using system 100 shown in FIG. 1 is provided. Process 700 may be implemented by a processor 304 (shown in FIG. 3) within or remote from visitor estimation computing device 102 (shown in FIG. 1). In the example embodiment, visitor estimation computing device 102 receives 702 an outdoor advertisement location, such as, a location of a billboard. In addition to a location, the outdoor advertisement location also includes information regarding which geographic direction the billboard is facing (i.e., one of the four cardinal directions of north, south, east or west; or some combination of the cardinal directions such as northeast, southeast, northwest, southwest, etc.) in order to define the direction of road and/or foot traffic that would most likely have a clear vantage point of the outdoor advertisement. Further, data that defines a size of the outdoor advertisement as well as a size of the text within the outdoor advertisement is accessed to determine, for example, one or more vantage point boundaries associated with the outdoor advertisement.

At 704, visitor estimation computing device 102 defines a geographical region that includes the outdoor advertisement location (e.g., the geographical region 110 shown in FIG. 1). In one embodiment, outdoor advertisement location is based on a pairing of latitude and longitude in a Cartesian coordinate grid, for example, a spherical coordinate system or an ellipsoid-based system such as the World Geodetic System, and the like.

At 706, visitor estimation computing device 102 receives interrogation signal data 104 (shown in FIG. 1) for the outdoor advertisement location over a period of time (e.g., from a few seconds to several days), with interrogation signal data 104 representing signals emitted from a group of mobile devices 106 (shown in FIG. 1). As explained above, the location of mobile devices 106 may be mapped to a geographical location to provide location, speed, and direction information.

At 708, visitor estimation computing device 102 determines a location of each of mobile device 106 and a direction each mobile device 106 is headed over the period of time based on the interrogation signal data 104 received from probe database 108. At 710, the location and direction of each mobile device is compared with the outdoor advertisement location information to determine the number of mobile devices associated with viewers or potential viewers of the outdoor advertisement. Using this information, a location value of the outdoor advertisement may be calculated based on the number views the outdoor advertisement receives within a period of time (e.g., every minute, hour, or day).

Figure 8:
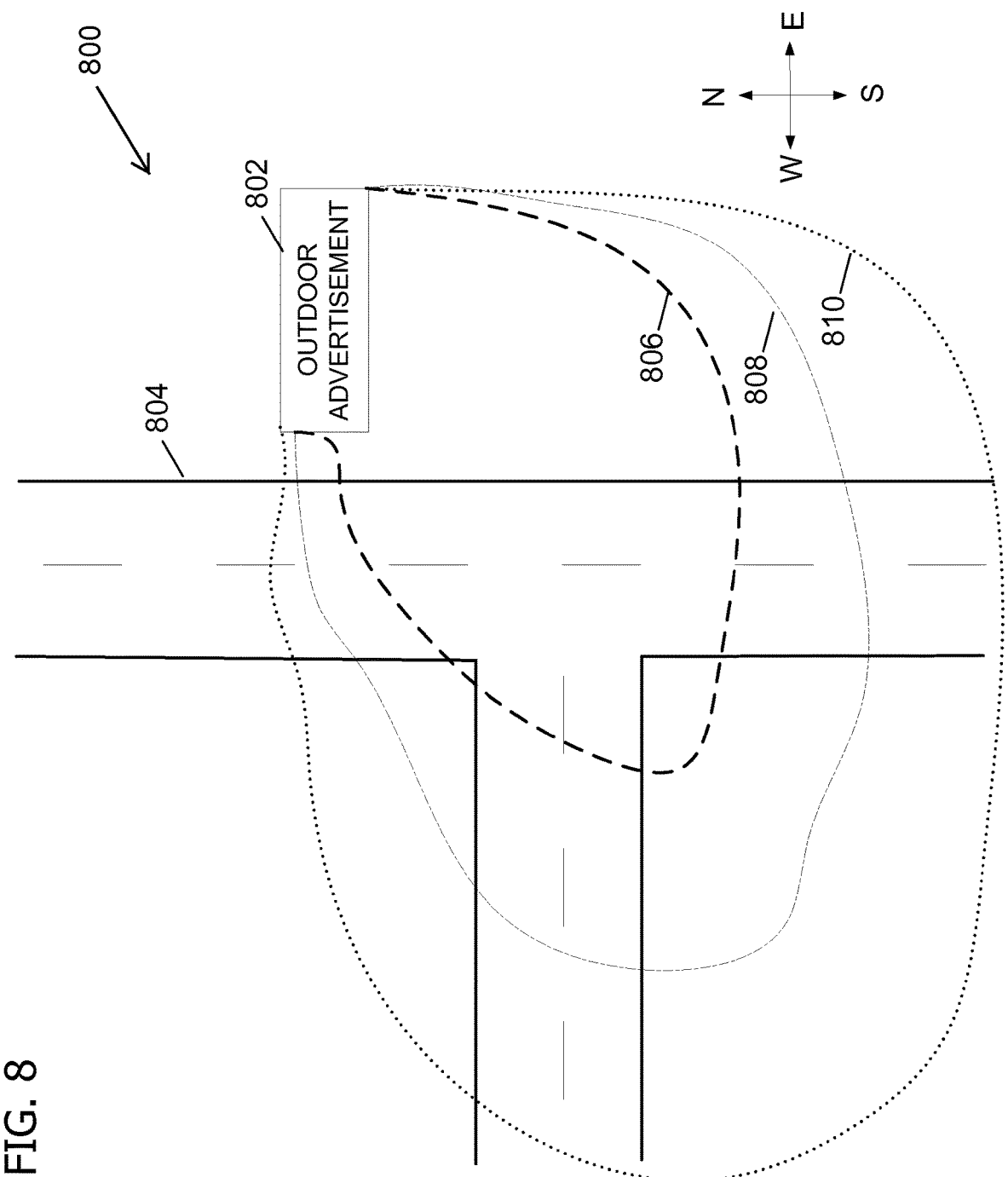

In one embodiment, vantage point boundaries are defined to determine a likelihood of a viewer having a clear vantage point of an outdoor advertisement. For example, as shown in FIG. 8, an outdoor advertisement 802 (facing south) is placed alongside a roadway 804. Vantage point boundaries 806, 808, and 810 are used to determine a likelihood that outdoor advertisement 802 is seen by possible viewers. For example, a further distance a viewer is from outdoor advertisement 802, the less likely the viewer is to have seen outdoor advertisement 802. In the example shown in FIG. 8, 80% of viewers within vantage point boundary 806 that are determined to be traveling north are determined to have seen outdoor advertisement 802. However, only 60% of viewers within vantage point boundary 808 (which is a further distance away from outdoor advertisement 802 than vantage point boundary 806) that are determined to be traveling north are determined to have seen outdoor advertisement 802. Further, only 10% of viewers within vantage point boundary 810 (which is a further distance away from outdoor advertisement 802 than both vantage point boundary 806 and 808) that are determined to be traveling north are determined to have seen outdoor advertisement 802. While these percentages are provided for illustrative purposes only, the greater distance a viewer is from outdoor advertisement 802, the less likely outdoor advertisement 802 is to have been seen by the viewer.

In one embodiment, the likelihood that a viewer sees outdoor advertisement 802 may also be based on how many vantage point boundaries the viewer passes through. For example, if a viewer passes through all three vantage point boundaries shown in FIG. 8, the likelihood the viewer sees outdoor advertisement 802 may increase from 90% (e.g., the likelihood the viewer would see outdoor advertisement from just being in vantage point boundary 806) to 98%. Further, a speed at which the viewer passes through each of the vantage point boundaries may increase/decrease the likelihood that the viewer has seen outdoor advertisement 802. For example, the percentages provided for each vantage point boundary may be based on a speed limit at that particular location along road 804. However, if it is determined from the probed data that a viewer is speeding, these percentages may drop accordingly. In contrast, if it is determined from the probe data that the viewer is passing by at a slower rate of speed than the speed limit (e.g., the viewer is stuck in traffic), the likelihood that the viewer will see outdoor advertisement 802 increases.

In another embodiment, weather and/or the time of day may also be taken into consideration when determining whether or not a viewer may have seen outdoor advertisement 802. For example if it is raining, a percent likelihood that a viewer will have seen outdoor advertisement 802 decreases. Further, the likelihood that a viewer would have seen outdoor advertisement 802 may increase at night if outdoor advertisement 802 has lights shining on it.

In a further embodiment, an effectiveness of the outdoor advertisement may be determined by comparing probe data used to determine which viewers have seen the outdoor advertisement (as shown in FIGS. 7 and 8) with probe data collected at a merchant location (as shown in FIG. 6). For example, as explained above, probe data (e.g., interrogation signal data 104 that represents signals emitted from mobile devices 106) is unique to each mobile device. Thus, the probe data collected to determine a number of views an outdoor advertisement may be compared with the probe data collected to determine the number of customers a particular merchant location has. In this embodiment, an outdoor advertisement associated with a particular merchant location or a product/service is mapped to the particular merchant location and or a merchant location that sells the particular product/service. In other words, the system receives a real property location associated with the outdoor advertisement. Generally, by comparing the probe data collected for the outdoor advertisement (e.g., as shown in FIGS. 7 and 8) with the probe data collected to determine customer traffic at a particular merchant location (e.g., as shown in FIG. 6), the users that have viewed a particular outdoor advertisement and that have visited a merchant location associated with the outdoor advertisement may be matched/determined.

More particularly, the system may identify each mobile device associated with a viewer or potential viewer as a viewer mobile device. Based on a second set of interrogation signal data received for the group of mobiles devices that includes the viewer mobile devices over a second period of time (e.g., a number of minutes or hours after a first set of interrogation signal data, the system may designate a second location for each viewer mobile device. The second location may be compared to the real property location to determine the number of viewer mobile devices to visit the real property location. Thus, understanding which customers visiting and/or purchasing a particular product/service from a merchant location that have also been determined to have seen an outdoor advertisement can be calculated and compared to viewers who have seen the outdoor advertisement but do not visit the merchant location and customers who visit the merchant location but have not been determined to have seen the outdoor advertisement.

Figure 9:
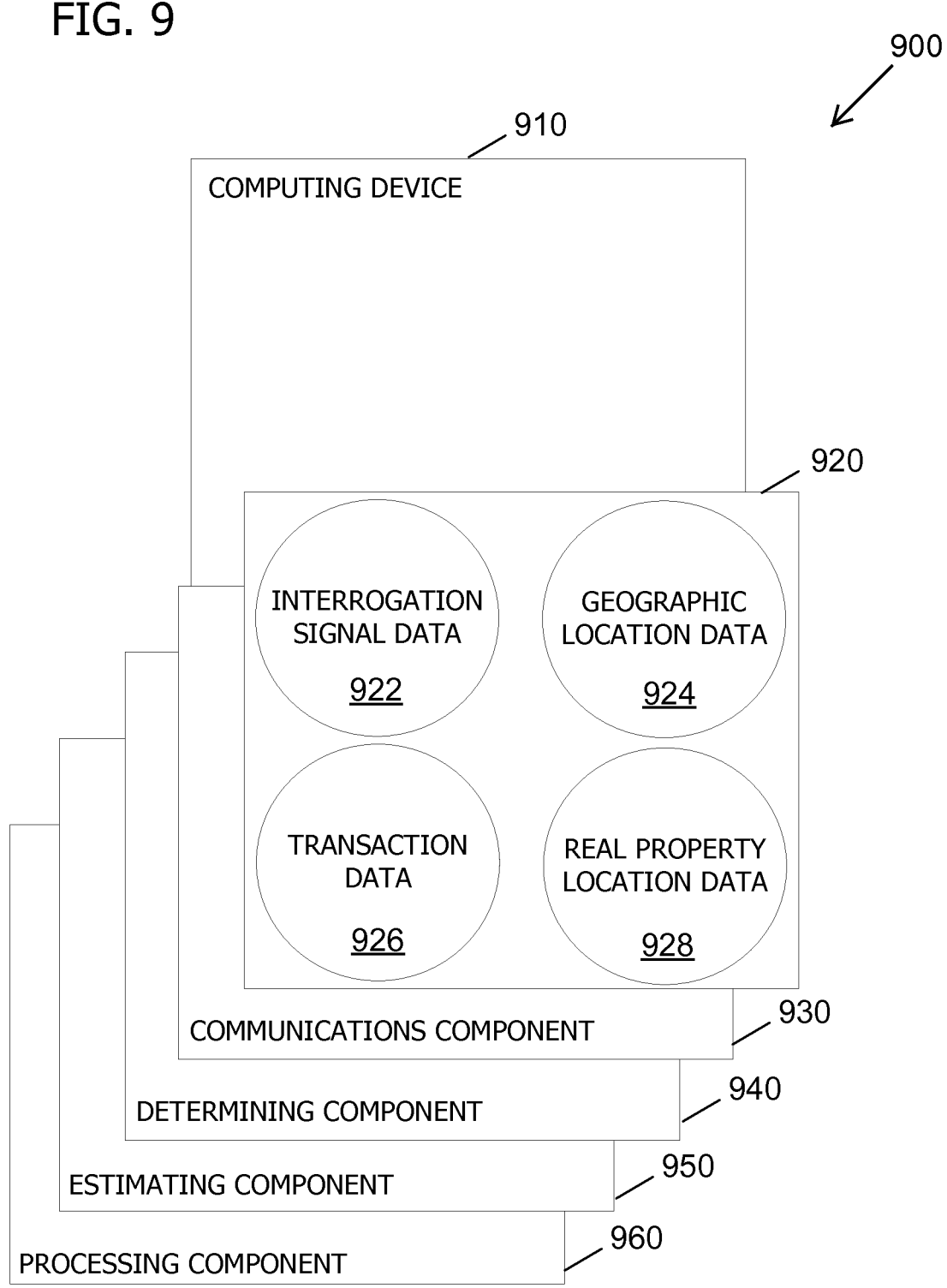

FIG. 9 is a diagram 900 of components of one or more example computing devices that may be used in system 100 shown in FIG. 1. In some embodiments, computing device 910 is similar to visitor estimation computing device 102 shown in FIG. 1. Computing device 910 includes a database 920 that may be coupled with several separate components within computing device 910, which perform specific tasks. In this embodiment, database 920 includes interrogation signal data 922, geographic region data 924, transaction data 926, and real property location data/outdoor advertisement location data 928. In some embodiments, database 920 is similar to memory 306 (shown in FIG. 3).

Computing device 910 also includes a communication component 930 for receiving real property locations/outdoor advertisement locations, and receiving interrogation signal data for a geographic region over a period of time. Computing device 910 also includes a defining component for defining a geographic region that includes a real property location and/or defining vantage point boundaries for outdoor advertisements. A determining component 940 is also included for determining a location of each of a plurality of mobile devices over a period of time based on received interrogation signal data. An estimating component 950 is also included for estimating visitor traffic for the real property location over the period of time and/or viewers of an outdoor advertisement over a period of time based on the location of each of the plurality of mobile devices over the period of time. A processing component 960 assists with execution of computer-executable instructions associated with system 100.

The computer-executable instructions may cause the processing component 960 and/or one or more processors to: (i) receive a real property location; (ii) define a geographic region that includes the real property location; (iii) receive interrogation signal data for the geographic region over a period of time; (iv) determine a location of each of the plurality of mobile devices over the period of time based on the received interrogation signal data; and (v) estimate visitor traffic for the real property location over the period of time based on the location of each of the plurality of mobile devices over the period of time. The computer-executable instructions may further cause the processing component 960 and/or one or more processors to do one or more of the following: (vi) receive a second set of interrogation signal data for the geographic location over a second period of time; (vii) designate the location of each of the plurality of mobile device users over the first period of time as a first location of each of the plurality of mobile device users; (viii) determine a second location of each of the plurality of mobile devices and a first location of any new mobile devices over the second period of time based on the second set of received interrogation signal data; (ix) update the estimated visitor traffic for the real property location based on the second location of each of the plurality of mobile devices and the first location of any new mobile devices over the second period of time; (x) calculate a speed at which each of the plurality of mobile devices traveled from their first location to their respective second location; (xi) compare the calculated speeds of the plurality of mobile devices with a pedestrian threshold level speed; (xii) identify each of the plurality of mobile devices that have a calculated speed above the pedestrian threshold level speed as a mobile device within an automobile; and (xiii) adjust the estimated visitor traffic for the real property location based on: the second location of each of the plurality of mobile devices, the first location of any new mobile devices over the second period of time, and each of the mobile devices identified as being within an automobile.

Additionally or alternatively, wherein the real property location comprises a plurality of merchant stores, the computer-executable instructions may further cause the processing component 960 and/or one or more processors to do one of more of the following: (a) calculate a location value of each of the plurality of merchant stores based on their proximity to the determined location of each of the plurality of mobile devices over the period of time and the estimated visitor traffic over the period of time; (b) receive payment transaction data associated with the real property location; (c) determine a number of payment transactions over the period of time based on the received payment transaction data associated with the real property location; and (d) estimate customer traffic for the real property location over the period of time based on the estimated visitor traffic and the determined number of payment transactions over the period of time.

The systems and processes are not limited to the specific embodiments described herein. In addition, components of each system and each process can be practiced independent and separate from other components and processes described herein. Each component and process also can be used in combination with other assembly packages and processes.

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

While the disclosure has been described in terms of various specific embodiments, those skilled in the art will recognize that the disclosure can be practiced with modification within the spirit and scope of the claims.

As will be appreciated based on the foregoing specification, the above-described embodiments of the disclosure may be implemented using computer programming or engineering techniques including computer software, firmware, hardware or any combination or subset thereof. Any such resulting program, having computer-readable code means, may be embodied or provided within one or more computer-readable media, thereby making a computer program product, i.e., an article of manufacture, according to the discussed embodiments of the disclosure. Example computer-readable media may be, but are not limited to, a flash memory drive, digital versatile disc (DVD), compact disc (CD), fixed (hard) drive, diskette, optical disk, magnetic tape, semiconductor memory such as read-only memory (ROM), and/or any transmitting/receiving medium such as the Internet or other communication network or link. By way of example and not limitation, computer-readable media comprise computer-readable storage media and communication media. Computer-readable storage media are tangible and non-transitory and store information such as computer-readable instructions, data structures, program modules, and other data. Communication media, in contrast, typically embody computer-readable instructions, data structures, program modules, or other data in a transitory modulated signal such as a carrier wave or other transport mechanism and include any information delivery media. Combinations of any of the above are also included in the scope of computer-readable media. The article of manufacture containing the computer code may be made and/or used by executing the code directly from one medium, by copying the code from one medium to another medium, or by transmitting the code over a network.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A computer-implemented method for estimating visitor traffic at a real property location comprising a plurality of merchant stores, based on interrogation signal data associated with a plurality of mobile devices, the method comprising:

receiving, by one or more processors, a real property location;

defining a geographic region that includes the real property location;

receiving, by the one or more processors, interrogation signal data for a group of mobile devices included within the plurality of mobile devices, the interrogation signal data emitted from the plurality of mobile devices and configured to locate available networks, and the group of mobile devices being located in the geographic region during a selected period of time;

determining a location of each of the mobile devices included within the group of mobile devices over the selected period of time based on the received interrogation signal data;

estimating visitor traffic for the real property location over the selected period of time based on the location of each of the mobile devices included within the group of mobile devices;

retrieving a plurality of payment transaction data including merchant identifiers associated with the real property location over the selected period of time, wherein the plurality of payment transaction data are extracted from messages submitted over a transaction card interchange network, and wherein the messages are formatted in proprietary communications standards;

estimating consumer traffic for the real property location over the selected period of time based on the plurality of payment transaction data; and rating a value of each of the plurality of merchant stores based on their proximity to the determined location of each of the mobile devices over the selected period of time and a ratio between the estimated visitor traffic and the estimated consumer traffic over the selected period of time.

2. The method in accordance with claim 1, wherein the interrogation signal data includes a location identifier for identifying the location of each of the plurality of mobile devices as each of the plurality of mobile devices emit a respective signal over the selected period of time.

3. The method in accordance with claim 1, wherein the group of mobile devices is a first group of mobile devices, the selected period of time is a first selected period of time, and the interrogation signal data is a first set of interrogation signal data, the method further comprising:

receiving a second set of interrogation signal data for a second group of mobile devices included within the plurality of mobile devices, the second group of mobile devices being located in the geographic region over a second selected period of time;

designating the location of each of the mobile devices of the first group of mobile devices over the first selected period of time as first locations;

designating the location of each of the mobile devices of the second group of mobile devices over the second selected period of time as second locations;

comparing the first locations and the second locations; and updating the estimated visitor traffic for the real property location based on the comparison, the updated estimated visitor traffic including each of the mobile devices included within the first group of mobile devices, and each of the mobile devices included in the second group of mobile devices that are not also included in the first group of mobile devices.

4. The method in accordance with claim 3, further comprising displaying a direction of movement of each of the mobile devices included within the first group of mobile devices and the second group of mobile devices from the first locations to the respective second locations.

5. The method in accordance with claim 3, further comprising:

calculating a speed at which each of the mobile devices traveled from the respective first location to the respective second location;

comparing the calculated speeds of the mobile devices with a pedestrian threshold level speed;

identifying each of the mobile devices that have a calculated speed above the pedestrian threshold level speed as a mobile device within an automobile; and adjusting the estimated visitor traffic for the real property location to account for the mobile devices identified as being within an automobile.

6. The method in accordance with claim 1, further comprising calculating a location value of each of the plurality of merchant stores based on the rating.

7. A visitor estimation computer system for estimating visitor traffic at a real property location comprising a plurality of merchant stores, based on interrogation signal data associated with mobile devices, the visitor estimation computer system comprising:

a probe database comprising interrogation signal data representing signals emitted from a plurality of mobile devices; and a processor programmed to:
receive a real property location;
define a geographic region that includes the real property location;
receive, from the probe database, interrogation signal data for a group of mobile devices included within the plurality of mobile devices, the interrogation signal data emitted from the plurality of mobile devices and configured to locate available networks, and the group of mobile devices being located in the geographic region over a selected period of time, the interrogation signal data including a signal strength value;
determine a location and path of each of the mobile devices included within the group of mobile devices over the selected period of time based on the received interrogation signal data;
estimate visitor traffic for the real property location over the selected period of time based on the location of each of the mobile devices included within the group of mobile devices;
retrieve a plurality of payment transaction data including merchant identifiers associated with the real property location over the selected period of time, wherein the plurality of payment transaction data are extracted from messages submitted over a transaction card interchange network, and wherein the messages are formatted in proprietary communications standards;
estimate consumer traffic for the real property location over the selected period of time based on the plurality of payment transaction data; and
rate each of the plurality of merchant stores based on their proximity to the determined location of each of the mobile devices over the selected period of time and a ratio between the estimated visitor traffic and the estimated consumer traffic over the selected period of time.

8. The visitor estimation computer system in accordance with claim 7, wherein the interrogation signal data includes a location identifier for identifying a location of each of the plurality of mobile devices as each of the plurality of mobile devices emit a respective signal over the selected period of time.

9. The visitor estimation computer system in accordance with claim 7, wherein the group of mobile devices is a first group of mobile devices, the selected period of time is a first selected period of time, and the interrogation signal data is a first set of interrogation signal data, and wherein the processor is further programmed to:
receive, from the probe database, a second set of interrogation signal data for a second group of mobile devices included within the plurality of mobile devices, the second group of mobile devices being located in the geographic region over a second selected period of time;
designate the location of each of the mobile devices of the first group of mobile devices over the first selected period of time as first locations;
designate the location of each of the mobile devices of the second group of mobile devices over the second selected period of time as second locations;
compare the first locations to the second locations; and
update the estimated visitor traffic for the real property location based on the comparison, the updated estimated visitor traffic including each of the mobile devices included within the first group of mobile devices, and each of the mobile devices included in the second group of mobile devices that are not also included in the first group of mobile devices.

10. The visitor estimation computer system in accordance with claim 9, further comprising a display device, and wherein the processor is further programmed to display a direction of movement of each of the mobile devices included within the first group of mobile devices and the second group of mobile devices from the first locations to the respective second locations.

11. The visitor estimation computer system in accordance with claim 9, wherein the processor is further programmed to:
calculate a speed at which each of the mobile devices traveled from the respective first location to the respective second location;
compare the calculated speeds of the mobile devices with a pedestrian threshold level speed;
identify each of the mobile devices that have a calculated speed above the pedestrian threshold level speed as a mobile device within an automobile; and
adjust the estimated visitor traffic for the real property location to account for the mobile devices identified as being within an automobile.

12. The visitor estimation computer system in accordance with claim 7, wherein the real property location comprises a plurality of merchant stores, and wherein the processor is further programmed to calculate a location value of each of the plurality of merchant stores based on their proximity to the determined location of each of the mobile devices over the selected period of time and the estimated visitor traffic over the selected period of time.

13. The visitor estimation computer system in accordance with claim 7, further comprising:
at least one server of the transaction card interchange network that receives the messages corresponding to a plurality of payment transactions for processing and extracts the payment transaction data from the messages; and
a transaction database for storing the payment transaction data.

14. A computer system for estimating a number of views of an outdoor advertisement by a viewer based on interrogation signal data associated with mobile devices, the computer system comprising:
a probe database comprising interrogation signal data representing signals emitted from a plurality of mobile devices; and
a processor programmed to:
receive an outdoor advertisement location;
define a geographic region that includes the outdoor advertisement location;
receive, from the probe database, interrogation signal data for a group of mobile devices included within the plurality of mobile devices, the group of mobile devices being located in the geographic region over a selected period of time, the interrogation signal data emitted from the plurality of mobile devices and configured to locate available network, the interrogation signal data including a signal strength value and a mobile device identifier;
determine a location of each of the mobile devices included within the group of mobile devices and a direction in which each of the mobile devices is moving over the selected period of time based on the interrogation signal data;

estimate a number of viewers of the outdoor advertisement over the selected period of time based on the location and direction of movement of each of the mobile devices over the selected period of time;

retrieve a plurality of payment transaction data including merchant identifiers associated with the outdoor advertisement location over the selected period of time, wherein the plurality of payment transaction data are extracted from messages submitted over a transaction card interchange network, and wherein the messages are formatted in proprietary communications standards;

estimate a number of consumers for the outdoor advertisement location over the selected period of time based on the plurality of payment transaction data; and rate a value of the outdoor advertisement location based on its proximity to the determined location of each of the mobile devices over the selected period of time and a ratio between the estimated viewers and the estimated consumers over the selected period of time.

15. The system in accordance with claim 14, wherein the outdoor advertisement location includes information representing a geographic direction in which the advertisement is directed.

16. The system in accordance with claim 14, wherein defining a geographic region that includes the outdoor advertisement location includes defining at least one vantage point boundary about the outdoor advertisement location, wherein each vantage point boundary is defined to measure a likelihood that any one of the group of mobile devices is associated with a viewer of the outdoor advertisement.

17. The system in accordance with claim 14, wherein the selected period of time is a first selected period of time and the interrogation signal data is a first set of interrogation signal data, and wherein the processor is further programmed to:

identify each mobile device of the group of mobile devices associated with a viewer of the outdoor advertisement as a viewer mobile device;

receive a real property location associated with the outdoor advertisement;

receive a second set of interrogation signal data for the group of mobile devices over a second selected period of time;

designate the location of each viewer mobile device over the first selected period of time as first locations;

designate the location of each viewer mobile device over the second selected period of time as second locations;

compare the second locations to the real property location;

determine a number of viewer mobile devices at the real property locations over the second selected period of time; and estimate a location value of the outdoor advertisement based on the number of viewer mobile devices at the real property location.

18. The system in accordance with claim 17 further comprising:

at least one server of the transaction card interchange network that receives the messages corresponding to a plurality of payment transactions for processing and extracts the payment transaction data from the messages; and a transaction database for storing the payment transaction data.

19. The system in accordance with claim 14, wherein the geographic region includes a plurality of outdoor advertisement locations, and wherein the processor is further programmed to rate each of the plurality of outdoor advertisement locations based on the location of each of the mobile devices with respect to the plurality of outdoor advertisement locations and direction of movement of each of the mobile devices over the selected period of time.

* * * * *